(12) United States Patent
Travers et al.

(10) Patent No.: US 6,870,532 B2
(45) Date of Patent: Mar. 22, 2005

(54) IMAGE DISPLAY

(75) Inventors: Paul Travers, Honeoye Falls, NY (US); Wesley Thierry, Rochester, NY (US)

(73) Assignee: Interactive Imaging Systems, Inc., Rochester, NY (US)

(*) Notice: Subject to any disclaimer, the term of this patent is extended or adjusted under 35 U.S.C. 154(b) by 348 days.

(21) Appl. No.: 10/096,726

(22) Filed: Mar. 13, 2002

(65) Prior Publication Data

US 2002/0190987 A1 Dec. 19, 2002

Related U.S. Application Data

(63) Continuation-in-part of application No. 09/591,362, filed on Jun. 9, 2000, now abandoned.

(51) Int. Cl.$^7$ .............................................. G06T 15/00
(52) U.S. Cl. ...................................................... 345/419
(58) Field of Search ........................ 345/30, 419, 420, 345/421, 427, 530, 536, 585, 618, 660, 666, 781, 782, 788, 806, 578, 580, 582; 348/333.03, 333.09, 335, 340, 552, 242, 276, 285; 382/110, 165, 128, 284, 286

(56) References Cited

U.S. PATENT DOCUMENTS

| | | |
|---|---|---|
| 5,384,588 A | 1/1995 | Martin et al. |
| 5,489,940 A | 2/1996 | Richardson et al. |
| 5,592,286 A | 1/1997 | Fedor |
| 5,684,498 A | 11/1997 | Welch et al. |
| 5,767,820 A | 6/1998 | Bassett et al. |
| 5,767,833 A | 6/1998 | Vanderwiele et al. |
| 5,990,941 A | 11/1999 | Jackson et al. |
| 5,999,660 A | 12/1999 | Zorin et al. |
| 6,002,430 A | 12/1999 | McCall et al. |
| 6,009,190 A | 12/1999 | Szeliski et al. |

*Primary Examiner*—Mark Zimmerman
*Assistant Examiner*—Enrique L. Santiago
(74) *Attorney, Agent, or Firm*—Stephen B. Salai, Esq.; Donna P. Suchy, Esq.; Harter, Secrest & Emery LLP (57) ABSTRACT

The present invention converts a wide-angle lens image into a two dimensional view with reduced distortion and warping. The present invention uses a graphics engine which accepts a shape, an image, and a viewing position. An effective lens shape, corresponding to the recording lens, an image as well as a image-related viewing position is supplied to the graphics engine. The graphic engine projects the image on the effective shape and displays a portion of the image from the viewing position. The recording lens is often a wide-angle lens. The graphics rendering engine maps the wide-angle lens image onto an effective lens shape and displays sections of the mapped image on the shape in a full screen view. Portions of or the entire image are viewable at any one time. Use of acceleration hardware permits frame per second rates of display of up to 60 and greater frames per second. Typical wide-angle recording lenses include "fisheye" lenses and torus shaped (doughnut) lenses.

40 Claims, 5 Drawing Sheets

IMAGE DISPLAY

This application is a continuation-in-part of application Ser. No. 09/591,362 entitled METHOD AND APPARATUS FOR MAPPING IMAGES AND VIDEO TO CREATE NAVIGABLE, IMMERSIVE VIDEO AND IMAGES, filed Jun. 9, 2000 now abandoned.

FIELD OF THE INVENTION

This invention relates generally to an apparatus and method for displaying images and video created from wide angle or other recording lens systems. Specifically, the present invention uses a graphics-rendering engine (graphics engine) to accept an effective lens shape, an image, and a viewing position such that the effective lens shape corresponds to the recording geometry and original recording lens system. The graphic engine renders or projects the image on the effective shape and displays a portion of the image from the viewing position thus correcting for distortion created during recording which is particularly evident where images are formed using wide angle lenses or 360 degree panoramic lenses. The graphics engine, viewpoint and size inputs enable the displayed portion of the image to be changed. The contemplated images may be still frame, live video, DVD, broadcast cable or any other images.

BACKGROUND OF THE INVENTION

Numerous applications exist for an immersive virtual reality environment. These include providing virtual tours of real estate, in which a user can select a particular area of a house or other property to be viewed more closely, security applications, theme park rides, surgical procedures, virtual travel tours, interactive television and many others. Prior art devices and procedures exist to create an immersive virtual reality environment. It is known how to map stored images in such a way as to create the immersive environment, but these techniques are mathematically very complex and time consuming to apply even with sophisticated computer hardware.

Currently in order to capture an image and use the virtual reality technology in conjunction with a wide-angle lens in a cost effective way, a user can record multiple small, essentially distortion free images that are stitched together at the edges to create one image. Wide-angle partial panoramic photos and 360° images can be recorded using either a standard camera or a digital camera. What this prior art does is to overlap the images to allow for the stitching and cropping using application software. The small images must be taken with approximately a 20–30% overlap to achieve a successful stitch and panoramic view. When using a standard camera, it is usually required to mount the camera on a tripod to achieve a common vertical reference point. This method does allow the virtual reality viewer to view the multiple images as one undivided image.

In order to make capturing images for virtual reality technology time efficient, less complex, and thus less expensive it is necessary to use lenses that can view larger angles of the environment. Lenses with a viewing angle between 120 and 180 degrees provide image information that capture larger parts of the data that is required to prepare an immersion view and eliminate the need to stitch together many small images. Currently, applications exist for displaying wide angle images, including those provided by fish-eye lenses, donut shaped lenses, and spherical lenses, but these applications are also too mathematically complex and time intensive to apply to real time situations.

Images captured by wide-angle lenses are difficult to display because they include significant aberrations that must be compensated for. There are primarily five common categories for the aberrations that a wide-angle lens produces. These categories are spherical aberration, chromatic aberration, astigmatism, distortion and field curvature. Distortion is the aberration most recognized and corrected for. Distortion is a two dimensional aberration that is ordinarily noticed when an image recorded by a wide-angle lens is projected on a plane surface. Most people recognize it by what some describe as a pincushion or barrel shaped distortion of the image.

One way that distortion from a wide-angle lens is corrected for when the image is displayed is by projecting the recorded image on a screen that has curvature. An example of this would be an OMNImax™ theater where the recorded image is displayed on a screen shaped like a dome. This technique is impractical for head mounted displays and for most low cost applications.

Current mathematical techniques for correcting for distortion in a displayed image use mathematical transforms that "flattens out" the displayed image in direction that is being viewed. This method requires sophisticated computer hardware for implementing the mathematical transformations as are discussed in U.S. Pat. No. 5,990,941 by Jackson, et. al., METHOD AND APPARATUS FOR THE INTERACTIVE DISPLAY OF ANY PORTION OF A SPHERICAL IMAGE (Jackson '941). Motorola has also attempted to simplify the complex mathematics needed to correct for distortions in U.S. Pat. No. 5,489,940 by Richardson, et. al., ELECTRONIC IMAGING SYSTEM AND SENSOR FOR CORRECTING THE DISTORTION IN A WIDE ANGLE LENS (Richardson '940). Richardson '940 uses a plurality of imaging elements distributed on the surface of a sensor that is represented by a nonlinear function, wherein the distribution of the imaging elements correct the distortion in the wide-angle image. The sensor has a rectangular array to transform a rectangular portion of the image produced by a wide-angle lens. Each of three sensing elements on the sensor has a unique two-dimensional address to allow the particular sensing element to be electronically accessed. In the Richardson '940 patent the address of an arbitrary sensing element can be represented by the coordinate pair (a, b). The physical location of a sensing element having an address (a, b) is given by (x, y) as follows:

$$x = R \sin((Ta/180)(n^2 + m^2)^{-1/2}) \quad (1)$$

and $$y = R \sin((Tb/180)(n^2 + m^2)^{-1/2}) \quad (2)$$

where (n, m), (−n, m), (n, −m) and (−n, −m) are rectangular coordinates of the physical boundaries of the rectangular sensing array. Although the Richardson '940 patent is supposed to be a simplification over the prior art, it is readily evident that this prior art still involves quite a bit of mathematical computations.

Since current virtual reality techniques are so complicated and expensive these applications are limited to users where the cost can be justified. There is a need for a simpler approach that would allow the virtual reality technique to be used more widely in both non-real time and real time situations. These could include both static and video presentations. In non-real time a viewer can stop and look around at any given point in time, observing different sections of the image. In real time viewing, a viewer can appear to be observing a realistic, continuous image if sufficiently high video frame rates are used to present the information in conjunction with real time virtual reality, immersion technology.

Lenses that have a viewing angle greater than 120 degrees create greater amounts of distortion at the edges. Since the present methods of correcting for these distortions are complex, these prior devices have not achieved greater than 20 frames per second display rates in immersive virtual reality, environments such as those methods that use complex mathematical techniques that are discussed in Jackson '941. A minimum of 24 frames per second display rates are needed to provide a non-jumpy continuous display of images, which adds realism to the viewer in a virtual reality or immersion situation. It is important that deformation and flicker be minimized, if not eliminated, and that the distortion at the edges of the image be removed so that the quality can be such to provide a realistic image. There is a need for an image display system, especially for wide angle lenses, which corrects for distortions and is mathematically simple, not complicated or time intensive, and thus can run in real time with minimal resources.

SUMMARY OF THE INVENTION

The present invention uses a graphics engine that accepts a shape, referred to hereafter as an effective lens shape, corresponding to the geometry of an original recording lens, an image, and an image-related viewing position. The graphics engine projects the image on the shape and displays a selected portion of the image as seen from the viewing position. The recording lens is often a wide-angle or ultra wide-angle lens.

It is important to remember that there is no real physical shape created in this process. The shape is most commonly an array of vertices that is interpreted as a shape by the graphical engine. This method is equivalent to the application of a correction to the recorded coordinates of the image. The recording lens causes the recorded image to be distorted when it is projected onto a plane surface. Geometric distortion occurs because the recording lens is projecting parts of the image from different directions onto a plane surface. The present invention may be applied to a focusing system including those with lenses that have a field of view from less than 180°, such as a 120° lens, to focusing systems that have a field of view greater than 90°.

The photographic image is converted into a bitmap and loaded into memory. The bitmap is rendered onto an effective shape which corresponds to the recording geometry and the original lens shape. Viewing position information is input for software routines that use orientation functions to accommodate changing viewing directions.

The present invention offers the ability to view an environment in real time or non-real time. In non-real time a viewer could stop and "look around" at any given point and time, observing different sections of the mapped image. For real time viewing, a hardware accelerator provides what appears to the viewer to be a natural continuous image by using a sufficiently high frame rate.

The present invention further relates to a method for viewing wide-angle lens photographs without distortion. The photographic image is converted into a bitmap; loaded into memory; an effective shape is created corresponding to the original lens shape, onto which the image bitmap will be rendered; the shape is loaded into memory; the image bitmap mapped or rendered onto the shape in such a way as to correct the distortion in the image when viewed from different positions; and the position information is supplied to software routines that provide for changing views using orientation functions.

DETAILED DESCRIPTION OF THE PREFERRED EMBODIMENT

Figure 1:
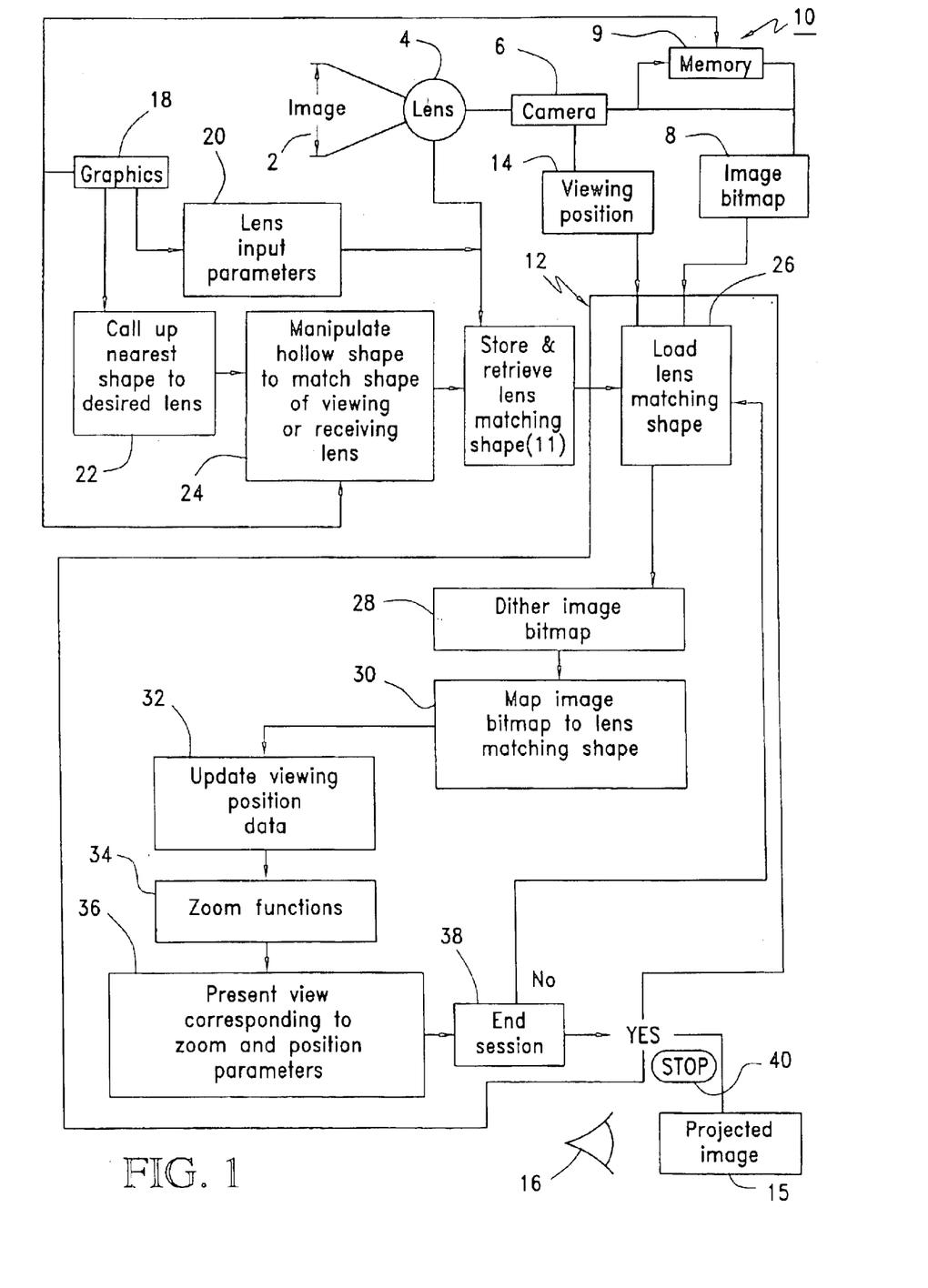
FIG. 1 depicts a functional block diagram of the present invention.
Figure 2:
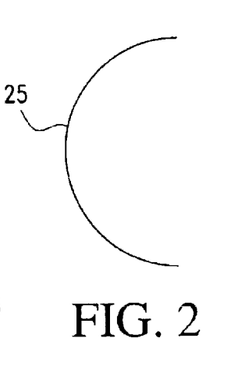
FIG. 2 depicts a hemispheric effective shape for a wide-angle lens.

In the present invention an image 2, to be mapped and viewed live or recorded for later viewing, is recorded through a recording lens 4 by a camera 6. The original recording "lens" may consist of a single lens, composite lens, a multiple lens system, or a focusing system. As shown in FIG. 1, there may be one or more lens 4a, 4b. For the sake of simplicity, the recording lens system will be referred to as the recording lens 4. The image 2 may be "live" and altered as it is filmed, it may come from storage, it may be cable broadcast, or it may come from a DVD (digital versatile disk).

Virtual reality technology often uses recording lenses that are a wide-angle lenses. Wide-angle partial panoramic photos, 120 to 180 degree lenses and 360-degree lenses can capture images in a cost-effective manner using either a standard camera or a digital camera. Examples of wide-angle and ultra wide-angle recording lenses include "fisheye" lenses and torus shaped (doughnut) lenses. The problem is that the recorded image has various types of distortions including spherical aberration, chromatic aberration, astigmatism, distortion and field curvature. Distortion is the aberration most recognized and corrected for when wide-angle lenses are used to capture an image. This is especially true in the area of virtual reality and video recordings. Distortion is a two dimensional aberration that most people recognize as a pincushion or barrel shaped image. Most prior art only corrects for this aberration because of cost considerations. The present invention can be used to correct for the distortion aberration but it can also be adapted to correct for other types of aberration in a similar cost-effective manner that will be discussed later.

A functional block diagram of the present system is shown in FIG. 1. The image 2 to be processed to remove distortion is projected by the recording lens 4 onto camera 6 that records the image. Whether the image 2 represents a photographic image, a stored frame or a live frame, it is converted to an image bitmap 8 and the image bitmap 8 can be loaded into memory 9. This image does not have to be viewable in the traditional sense at the point that the image bitmap 8 is created because it will be projected onto the effective shape before it is viewed. The only requirement is that sufficient information is captured in the image bitmap 8 to enable the invention to create an effective image later.

An image display apparatus 10 and method of the present invention supplies a shape corresponding to the recording lens 4, hereafter referred to as an effective lens shape 11, to a graphics rendering engine 12 hereafter referred to as a graphics engine 12. The image display apparatus 10 also supplies the image 2, in the form of the image bit map 8, and a viewing position, otherwise known as a relative position 14 to the graphics engine 12. The relative position information can be supplied, among other ways, through sensors in a head-mounted display, through a joystick or as a set of coordinates.

The image display apparatus 10 projects the image bit map 8 onto the effective lens shape 11 in order to display a portion of the image 2 from the viewing position 14, causing a projected image 15 to appear undistorted by a viewer 16 effectively positioned at that relative viewing position 14. The graphics engine 12 renders (sometimes referred to as mapping) the lens image 2 onto the effective lens shape 11 and displays sections of the mapped shape as part of a full screen view. The rendering will normally occur, based partially on the zoom factor, on the portion of the image that that the viewing position identifies.

The effective lens shape 11 is created using graphics software 18 in conjunction with various lens parameters 20 for the recording lens 4 in what will be referred to as a first order approximation of the original image. Alternatively a complimentary shape 22 that is nearest the shape of the recording lens 4 can be called up from memory 9. Even the lens parameters 20 for the recording lens 4, which are often complicated mathematical functions, can be used to actually generate the effective shape 11 in memory. Matching the shape of the lens is critical to reducing distortion to a viewer. If necessary, the created effective lens shape 11 or the complimentary shape from memory 22 can be manipulated using a manipulating step 24 to form the effective lens shape 11 that best matches the shape of the recording lens 4. This will be referred to as a second order approximation of the original image. These approximations of the original image should take into account the rendering method. The shape that is chosen is related to the rendering method such that the image must be rendered in a method appropriate to the shape chosen.

The manipulating step 24 can also be used while preparing the first order approximation of the shape 11 while viewing the lens matching shape directly or after rendering the image bitmap onto the lens matching shape. This is accomplished by manipulating the mapped image 24 until a match is made and the effective lens shape 11 created. Thus the manipulating step 24 can be used for first order approximations of the original image involving distortion or for higher order approximations that correct for other aberrations such as chromatic aberration, field curvature and astigmatism by as will be discussed below. The effective lens shape 11 is loaded into memory 9. Information relating to the recording lens 4 used for filming will be used to retrieve the effective lens shape 11, also referred to as the matching lens shape 11, from memory 9. As discussed above, the rendering method should be taken into account when choosing an effective lens 11.

For example when the original recording lens system is a wide-angle recording lens 4 that resembles a hemisphere, the designer will choose a hemisphere with a hemispheric surface 25 as the nearest complimentary shape 22. In this example, it is the surface that is important and the shape is the hemispheric surface. This first choice of the complimentary shape 22 is effectively a first order approximation of the recording lens 4 shape. In this example the graphics software 18 that graphically creates this hemispheric surface 25 can be a CAD program or a similar shape creating program. The effective lens shape 11, the hemisphere 25, is loaded into the graphics engine 12 after it is created. The effective shape 11 can be used as it is at that point if the match is close enough to achieve the desired results or it can be manipulated 24 creating second and higher levels of shape approximation. As one in the art will understand, once an effective shape 11 is found to work for a particular recording lens in a particular set of circumstances, that effective shape 11 is stored in memory 9 for future use.

The image display apparatus 10 and method can be useful if the lens shape is uncommon or difficult to ascertain. It is conceivable that a recording lens that was a cone would have a number of distortions, so much distortion that the recorded image may be difficult to view without the use of the image display apparatus 10 and associated method. When a cone-like effective lens 11 is used as described below, the viewed image would appear to be the same as the recorded image 2.

The effective lens shape 11 is loaded 26 into the graphics engine 12 along with the image bitmap 8 and the viewing position 14. Note that the viewing position may or may not correspond to the original position of the camera 6 and in fact is most effective when relatively close to the original position of the imager in the camera 6, also known as the place where the image is recorded which can at times be the focal plane. The relative position information can be supplied through sensors in a head-mounted display, through a joystick or as a set of coordinates.

The image bitmap is dithered 28 as shown in the functional block diagram of the invention shown in FIG. 1. The dithered image bitmap is mapped onto the lens matching shape 30. Viewing position information is updated 32. The portion of the image bitmap to be viewed is scaled according to the zoom information 34 presented on an image update sequence 36. A query line 38 is checked. If the user enters a command to terminate the session, video image updating stops 40. If the user does not enter a command to stop the session, position information and zoom command input are updated. A steerable real time corrected image is displayed on a CRT, LCD, or other video viewer. A computer receives image data from the video viewer or transmits image data to the video viewer.

Figure 3:
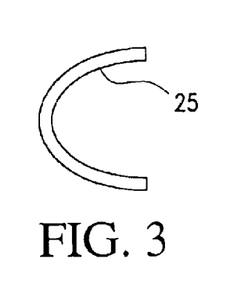
FIG. 3 shows a cross section of a hemispheric shape for mapping video data.
Figure 4:
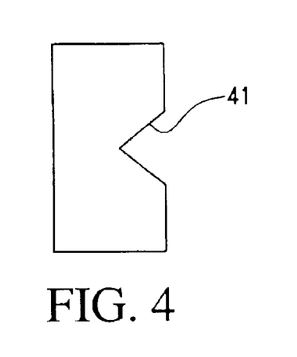
FIG. 4 shows a cross section of a rectangular solid having a V-shaped inside surface upon which the video data is mapped.

A more detailed description of the process in capturing and rendering an image from a lens to display including aberration corrections follows. The basic process of the invention can involve several additional steps. Using a graphics software 18, such as commercial CAD-like software applications, shapes can be created and then stored at a particular location in memory that is retrievable through a graphics rendering engine 12 such as Microsoft Graphics Direct X Version 6.0. It should be noted that this method is not dependent upon the graphics engine used. Other graphics engines including accelerators may be used including Nvidia's G Force graphics accelerator add-in printed circuit boards. A standard shape 22 nearest the lens shape is created by the graphics software 18 or called from a file such as a 3D Studio file. As discussed above in the embodiment described above, the hemispheric surface 25 shown in FIG. 3 is chosen as a first order approximation to correct for distortion of the original image. Alternatively, the chosen effective shape 11 may include other shapes that better match the shape of the recording lens. Some recording lenses have surfaces with a variety of nonstandard shapes 41, as shown in FIG. 4.

The effective shape 11 is stored in the memory 9 or in the graphics engine memory as vertices of a polygonal surface in an ASCII file, binary file or other computer readable file. Three or more adjacent vertices define a polygon that encloses at least one pixel. The number of pixels enclosed is dependent upon the zoom factor input to the system. One skilled in the art will understand that there are other ways to store the image data including vectors and matrices. The manipulating step 24 of validating the shape is now described in more detail.

Figure 5:
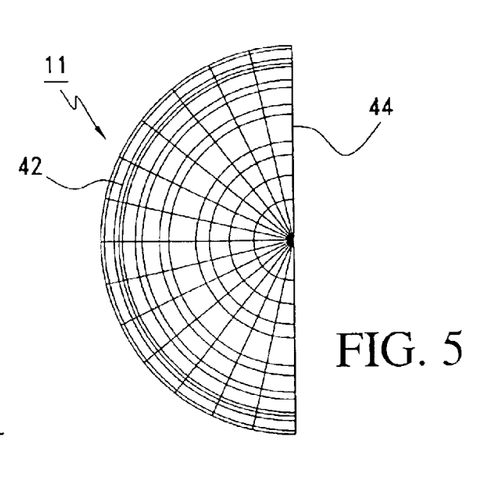
FIG. 5 depicts a top view of hemispheric wire frame on which the image of a wide-angle lens is mapped.
Figure 6:
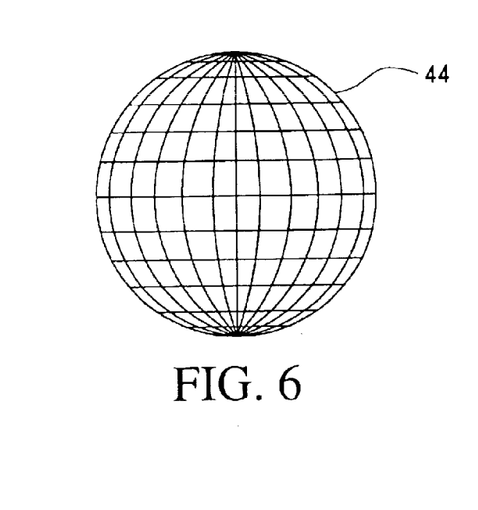
FIG. 6 depicts a front view of hemispheric wire frame on which a wide-angle lens view is mapped.
Figure 7:
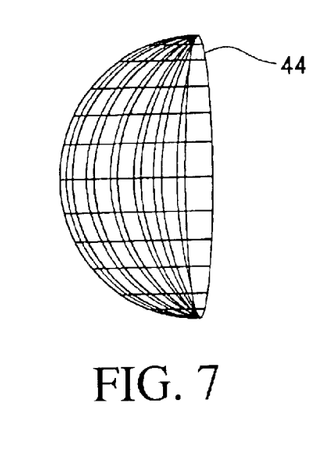
FIG. 7 depicts a perspective view of hemispheric wire frame on which the image of a wide-angle lens is mapped.

When the effective shape 11 is first created or loaded in the graphics engine 12, it is made malleable as if it were a wire frame 42 as shown in FIG. 5. FIGS. 5–7 show detailed views of a wire hollow hemisphere 44 from various angles. FIG. 5 shows a top-down view of the hollow hemisphere 44. FIG. 6 shows a frontal view of the hollow hemisphere 44. FIG. 7 shows a perspective view of the hollow hemisphere 44. A designer is able to alter the form of the shape by dragging on the wire frame 42 shaped like the hollow hemisphere 44. The designer transforms the hollow shape 44 into an effective shape 11 matching the wide-angle lens 20. The resultant shape may be hemispheric, oval, or of some other form that can provide a second order of approximation of the original image by allowing for the correction of other aberrations such as astigmatism and field curvature. Matching the shape of the lens 4 when creating the effective lens shape 11 is critical to reducing distortion and other aberrations to a viewer. This process can be done visually in real time so that the shape modification effect on the corrected image can be seen in real time.

The shape forming method just discussed is, from the perspective of the designer, a purely geometrical exercise. Any arithmetic processes are built into the shapes as they are formed and manipulated with the help of the graphics engine 12. There are neither trigonometric calls nor complex function calls as in the prior art. Difficulties in the prior art have been encountered in the mathematical modeling of certain lenses as described above. The use of a graphics accelerator card in conjunction with a graphics engine 12 permits the present invention to perform the same function with minimal CPU requirements.

Figure 8:
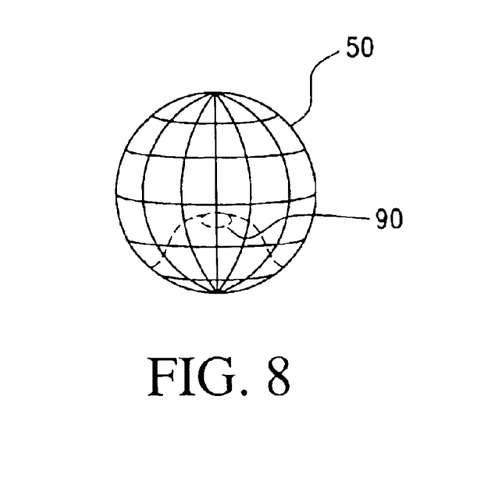
FIG. 8 shows a wire frame for a spherical lens matching shape.
Figure 9:
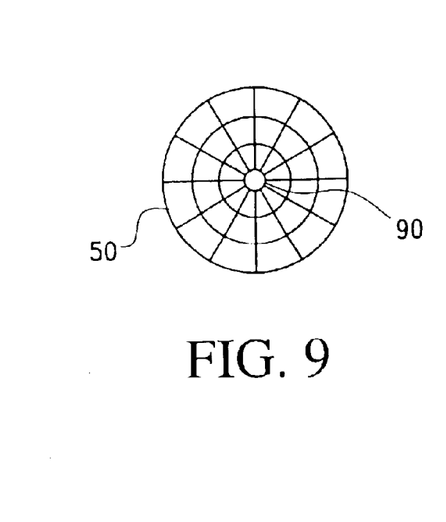
FIG. 9 shows a polar view for a spherical lens matching shape.
Figure 10:
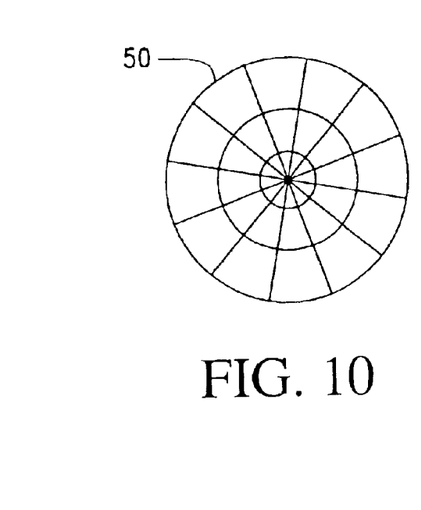
FIG. 10 shows another polar view for a spherical lens matching shape.

FIGS. 8–10 show a wire frame for a spherical lens matching shape. Two spherical shapes slightly differing in size can be subtracted from one another to produce a hollow sphere 50 to be used as an effective shape 11. The video image lensing feed 90 is located toward the center of the lens.

Two or three shapes of slightly differing size can also be used to make a third order approximation of the image by correcting for chromatic aberration. This is done by preferably overlying three colored meshes, one for red, blue and green such that each individual mesh is separately manipulated in the manner described above to correct for the chromatic aberration associated with the color.

Figure 11:
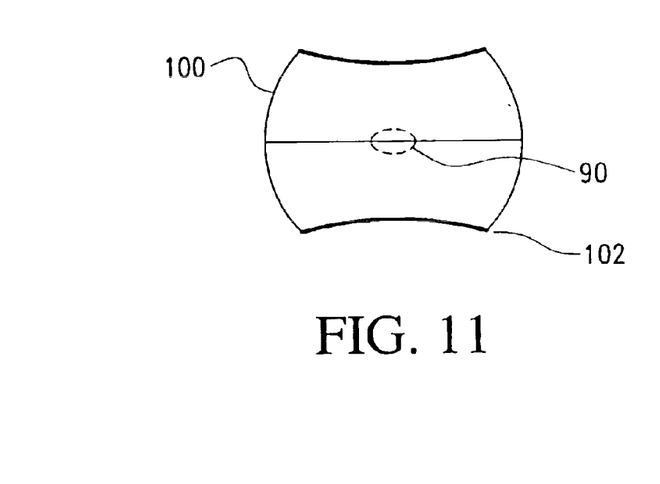
FIG. 11 shows two lenses that form a 360° doughnut shape.
Figure 12:
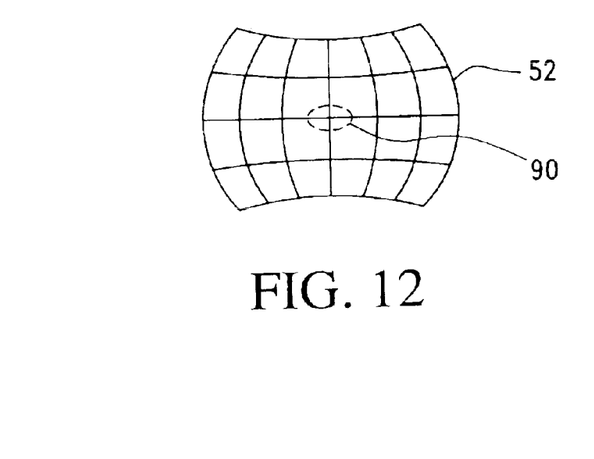
FIG. 12 shows a wire frame matching the shape of the lenses in FIG. 11.

FIGS. 11–12 show two lenses 100 and 102 from Cyclo Vision Technologies, Inc., which form a 360° toroidal shape. A video image lensing feed 90 is located at the center of the lens. A wire frame 52 follows the contours of the effective shape.

The video data is mapped onto the surface of the shape, forming a rendering of the video data image. Therefore, the outer surface may take on any form. For purposes of viewing standard video, a 360 degree hollow sphere, a 180 degree hemisphere, or a cylindrical shape are used.

Figure 13:
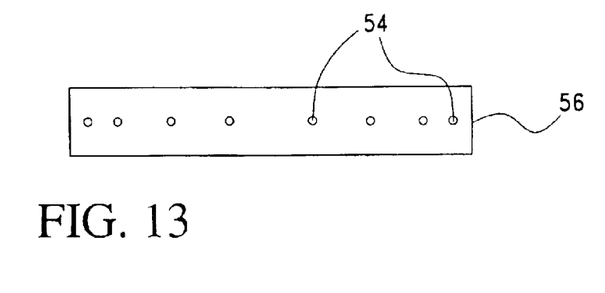
FIG. 13 shows the relative image density along a slice of a picture taken by a wide-angle lens.
Figure 14:
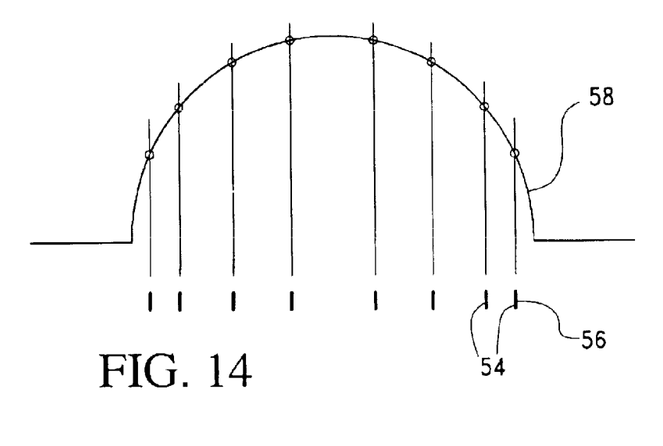
FIG. 14 is a graphical representation of the image data points being mapped onto data points corresponding to the shape required for correction.

In FIG. 13, a strip of image data points 54 along a lens image is taken. The data points are shown to be denser toward the outside of the lens image 56. In FIG. 14, the data points along the strip in FIG. 13 are mapped onto a curved surface 58 which could be the 360-degree hollow sphere, the 180-degree hemisphere, or the cylindrical shape for example.

DVD, broadcast cable, and OMNImax™ video may also be presented by the method of the present invention. The video is always mapped to a transformed or effective shape 11 representing the shape of the lens through which the image is captured. This lens matching shape is key to the process in reducing distortion.

The scaling and manipulative operations performed in step 24 of FIG. 1 can be performed by a variety of standard graphics engines 12. For example the scaling in the preferred method is performed by calling a Direct X library function set_scale. Manipulation is performed by calling a Direct X library function set_position. Note that these can be augmented or even replaced by a visual technique described below.

A copy of the entire wide-angle lens image (i.e., a scene) can be made. If a copy of a frame (i.e., the portion of the scene that is to be viewed) is made before performing enhancement operations, such as blending for crispness and clarity, then any damage to the image during the enhancement operation can be minimized and possibly reversed by starting with the copy and performing the enhancement operation a second time.

The hollow lens matching shape is saved in a file format known as a VWD file 22, which is a three dimensional image format which enables the Direct X Version 6.0 libraries to recognize it.

Figure 15:
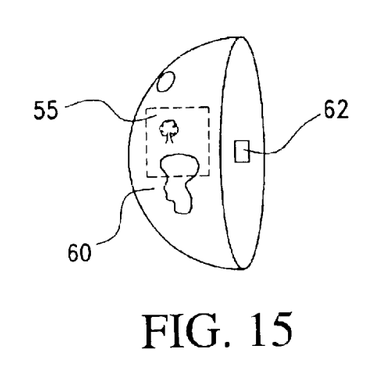
FIG. 15 shows a virtual camera that moves with respect to the hemispheric surface and a perspective view of an image mapped onto the hemispheric wire frame on which a wide-angle lens view is mapped.
Figure 17:
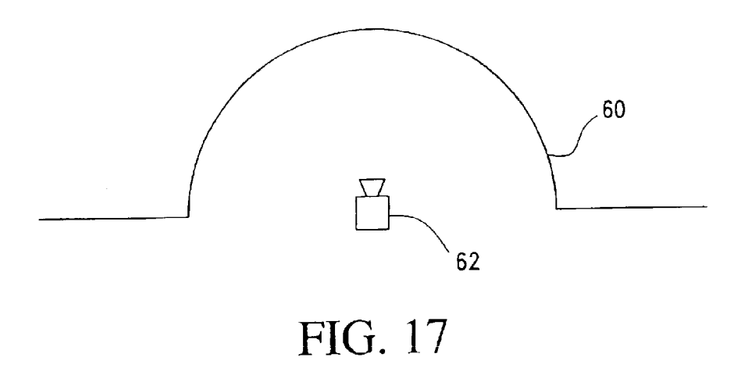
FIG. 17 shows a position for the virtual camera.

Once a digital photograph is loaded into memory, the image is mapped directly to the inside of the hollow lens matching shape. FIGS. 15 and 17 show the image 2 mapped to the hollow lens matching shape 50. Specific software has been developed to retrieve an image that has been mapped to the previously created shape. This software associates the streaming data onto the shape. The Direct X Version 6.0 software loads the shape into memory. The software of the present invention creates a wrap to a shape and centers a picture on the shape. The software is preferably written in C++.

Following the transferring of the digital image to the PC, the software (interpolation portion of the graphics engine 12) will take the image and perform some enhancements on the video before utilizing it such as adjustments for background lighting, pixellation, contrast, and balance. The interpolation engine uses the zoom factor and position coordinates to compute gray scale values of the RGB values during zoom in and zoom out operations. This is done on the fly. In a particular set up, a Pentium 350 MHz computer was used.

Illustrative software code for performing some of the enhancement operations (filtering) is as follows:

```
D3DUtil_InitMaterial (mtrl, 1.0f, 1.0f, 1.0f);
mtrl.power=40.0f;
g_pmtrlObjectMtrl->SetMaterial (&mtrl)
g_pmtrlObjectMtrl->GetHandle (pd3dDevice, &hmtrl);
pd3dDevice->SetLightState (D3DLIGHTSTATE_
    MATERIAL, hmtrl);
pd3dDevice->SetLightState (D3DLIGHTSTATE_
    AMBIENT, 0x404040);
D3DTextr_RestoreAllTextures (pd3dDevice)
pd3dDevice->SetTexture (0, D3DTextr_GetTexture
    ("pic1.bmp"))
pd3dDevice->SetRenderState (D3DRENDERSTATE_
    SHADEMODE, D3DSHADE_GOURAUD);
//pd3dDevice->SetLightState (D3DLIGHTSTATE_
    MATERIAL, hMat);
pd3dDevice->SetRenderState (D3DRENDERSTATE_
    CULLMODE, CullMode);
pd3dDevice->SetRenderState (D3DRENDERSTATE_
    DITHERENABLE, TextureDither);
pd3dDevice->SetRenderState (D3DRENDERSTATE_
    TEXTUREPERSPECTIVE, Texture_Perspective);
pd3dDevice->SetRenderState (D3DRENDERSTATE_
    TEXTUREMAPBLEND, TextureBlend);
pd3dDevice->SetRenderState (D3DRENDERSTATE_
    TEXTUREHANDLE, TextureHandle);
pd3dDevice->SetRenderState (D3DRENDERSTATE_
    TEXTUREMAG, TextureFilter);
pd3dDevice->SetRenderState (D3DRENDERSTATE_
    TEXTUREMIN, TextureFilter);
pd3dDevice->SetRenderState (D3DRENDERSTATE_
    SRCBLEND, srcBlend);
pd3dDevice->SetRenderState (D3DRENDERSTATE_
    DESTBLEND, dstBlend);
pd3dDevice->SetRenderState (D3DRENDERSTATE_
    FILLMODE, FillMode);
pd3dDevice->SetTexture (0, TextureHandle);
```

Once the digital image bitmap 8 is mapped to the inside of the hollow lens matching shape, the software creates a "virtual" camera 62 in the center of the scene, as shown in FIG. 15, as the viewing position 14 shown in FIG. 1. Calls to the IIS MAXimum3 software libraries link the orientation and the rotation elements of the camera to an external head mounted display. In this case, the device is the VFX 3D HMD, but could be a different head mounted display. Software has been developed to convert the position information such as yaw, pitch and roll from the VFX 3D format to values usable for the Direct X Version 6.0 software.

The software code for loading a hemisphere for camera surfaces (a generic procedure) is as follows:

```
// Load a DirectX.VWD file
/*while ( FALSE == g_bNewFileObject )
{//CHAR* strFileName = PromptUserForFileToLoad ( hWnd );
```

-continued

```
CHAR* strFileName = "c:\\windows\\desktop\\ball2.VWD";
if ( NULL == strFileName )
SendMessage ( hWnd, WM_CLOSE, 0, 0 );
    return 0 ;}*/
g_pFileObject -> Load ( strFileName );
/*// If the file was loaded, exit the loop. Else, display an error.
if ( g_pFileObject )
    g_bNewFileObject = TRUE;
else
    MessageBox ( NULL, TEXT ("Error loading specified
VWD file") , TEXT ("Xfile"), MB_OK|MB_ICONERROR );*/
```

A hand held cyberpuck (puck) or a similar mouse-type tool allows zooming in and out of the section of the image being displayed. The software also allows a viewer to view different portions of the wide-angle lens image as though the viewer was actually in an environment where the image was taken.

As part of the initialization procedure shown in FIG. 15, the puck view is set to the view that is presented to the viewer. Only portions 55 of a wide angle lens view are presented to a viewer at a given time. In other words, there is no mapping out of the entire wide-angle lens image onto a two dimensional screen. The rendering will occur on the portion of the image in the direction and based on the zoom factor, that the viewing position identifies.

The VFX 3D head mounted display software developed as part of the present invention polls the VFX 3D head mounted display for position data gotten through magnetic and liquid sensors within the head mounted display. The VFX 3D head mounted display software is preferably written in C++.

In the head mounted display software, the software checks to see if the puck is attached. If the puck is attached, the software queries to find out if any buttons on the puck have been pushed.

The software sets minimum and maximum limits on the values of the yaw, roll and pitch so as to keep the view within the constraints of the image. The software also converts the head mounted display yaw, pitch and roll to a format usable by the Direct X library functions.

In the software of the present invention, after the various positional calculations are made, a virtual camera is set to a new point in the image. Repositioning through the software is done before showing a new frame.

Following the mapping procedure, the Direct X Version 6.0 library allows the implementation of acceleration with a 3D graphics accelerator to permit frame rates which have been previously unachievable by other distortion correcting techniques. Using the hardware accelerator, frame rates of 60 frames per second are possible. This has immediate application for OMNImax™ screen type viewing.

The software automatically polls the computer for an acceptable hardware accelerator and selects one. Hardware acceleration is critical because the polygon count of the hollow lens matching shape would greatly reduce the performance of the software. This will also free the CPU for other tasks required to maintain a virtual environment.

Figure 16:
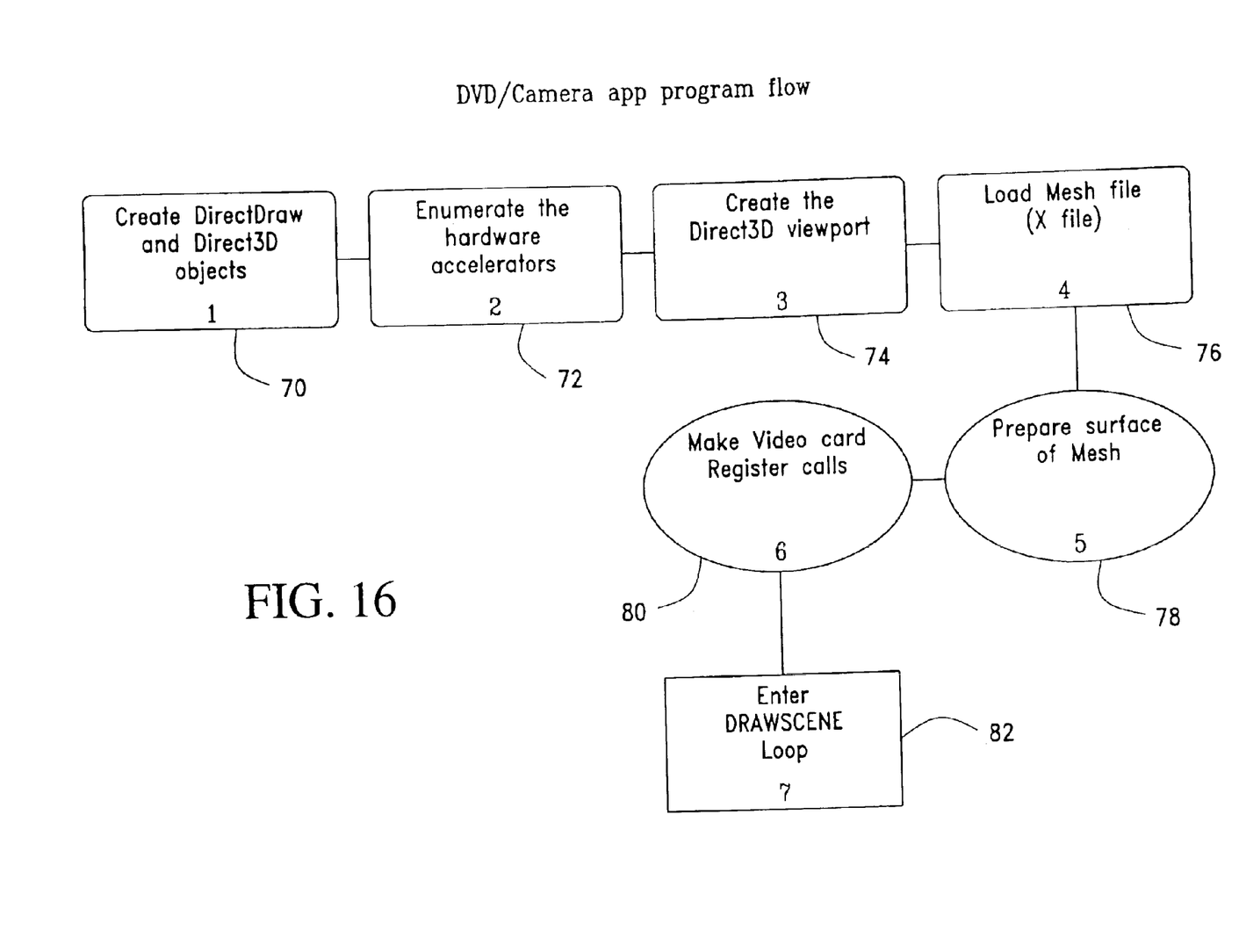
FIG. 16 shows a flowchart for the present invention using a DVD.

FIG. 16 shows a flowchart for the steps involved in showing images stored on DVD.

In the first step, in an operation block 70, the DirectDraw and Direct3D objects are created. This includes the designation of surface pointers and construction of Meshbuilder objects. The Meshes correspond to the playback shape. They are the DirectX files created in 3D Studio.

In the second step, in operation block 72, the hardware accelerators are enumerated. The equipment is checked for the proper hardware acceleration support. Hardware acceleration provides the requisite frame rate for video viewing.

In the third step, in operation block 74, the Direct3D viewport is created. All images to be displayed are drawn in the viewport.

In the fourth step, in operation block 76, the virtual shape file is loaded into the Direct3D Meshbuilder object and is stored for use.

In the fifth step, in operation block 78, the surface of the mesh is prepared. DirectDraw surfaces are attached to the mesh surfaces and are prepared for accepting video data.

In the sixth step, in operation block 80, video card register calls are made. Calls are made to the video card registers to tell it where to put the video data when it is streamed.

Finally, the program enters a display update loop in operation block 82. In the display update loop, the mesh is loaded into the viewport and positioned appropriately, video data is then directed onto the mesh surface (blitting), an entire scene is drawn in the viewport, and tracker information from a head mounted display or mouse is checked to position the image.

While the invention has been described with reference to preferred embodiments, those familiar with the art will understand that various changes may be made without departing from the scope of the invention. In addition, many modifications may be made to adapt a particular situation to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appending claims.

What is claimed:

1. An image display apparatus for displaying an image created by a recording lens with a graphics rendering engine which accepts a shape, an image, and a viewing position comprising:
    (a) a first memory connected to the graphics rendering engine to store the shape that corresponds to the recording lens;
    (b) a second memory connected to the graphics rendering engine to store the image created by the recording lens that can be rendered onto the shape;
    (c) a third memory connected to the graphics rendering engine to store the viewing position; and
    (d) a display connected to the graphics rendering engine to display a portion of the image from the viewing position.

2. The apparatus of claim 1 in which the shape is a mesh.

3. The apparatus of claim 2 in which the mesh shape is a modification of the shape.

4. The apparatus of claim 3 in which the shape comprises a rendered image comprising an array of pixels.

5. The apparatus of claim 1 the shape further comprising a plurality of shapes corresponding to a plurality of colors of the stored image, the plurality of shapes scaled to correct for chromatic aberration in the stored image.

6. The apparatus of claim 1 the stored image further comprising a plurality of stored images corresponding to a plurality of colors and scaling the stored images provided in the graphics rendering engine to correct for chromatic aberration.

7. The apparatus of claim 1 the supplied shape further comprising a shape created using a mathematical equation.

8. A method for correcting for chromatic aberration comprising:
    (a) displaying an image formed by a lens exhibiting axial chromatic aberration; and
    (b) separately scaling and rendering the different color components of the image to correct for chromatic aberration using a shape corresponding to the recording lens; wherein scaling further comprises the scaling of a bitmap image using the shape of the recording lens, and the scaling of the image on which the shape is rendered.

9. A method for displaying an image created by a recording lens with a graphics rendering engine which accepts a shape, an image, and a viewing position comprising:
    (a) supplying a shape to the graphics rendering engine that corresponds to the recording lens;
    (b) supplying an image to the graphics rendering engine that can be rendered to the shape;
    (c) supplying an image-related viewing position to the graphics rendering engine that can be rendered on the shape;
    (d) rendering the image onto the shape;
    (e) displaying the image from the viewing position.

10. The method of claim 9 in which the shape is a mesh.

11. The method of claim 10 in which the mesh shape is modified.

12. The method of claim 11 in which the rendering step comprises rendering a portion of the image comprising an array of pixels to the mesh on the surface.

13. The method of claim 9 in which supplying the shape that corresponds to the recording lens further comprises the additional step of creating a first order approximation of the shape.

14. The method of claim 13 which comprising the additional steps of rendering the image first order approximation of the shape and using the rendered image to manipulate the shape to create a second order approximation of the shape.

15. The method of claim 14 further comprising rendering the image on the second order shape and creating a third order approximation of the shape.

16. The method of claim 13 in which supplying the shape that corresponds to the recording lens comprises separately supplying a plurality of shapes corresponding to a plurality of colors of the stored image, the plurality of shapes scaled to correct for chromatic aberration in the stored image.

17. The method of claim 13 comprising the step of providing separate stored images corresponding to a plurality of colors and scaling the stored images provided in the graphics rendering engine to correct for chromatic aberration.

18. The method of claim 9 in which supplying the shape that corresponds to the recording lens further comprises the additional step of supplying a shape created using a mathematical equation.

19. The method of claim 9, further comprising the step of dithering the image comprising an array of pixels while rendering.

20. The method of claim 9, further comprising the step of gathering position information from a viewer occurring after the step of rendering the image onto the shape.

21. The method of claim 20, further comprising the step of calling software routines to provide for changing views using orientation functions, in which the frame per second rate gives fluid motion, occurring after the step of receiving position information.

22. The method of claim 21, the step of rendering the image bitmap entails using a portion of the image bitmap.

23. The method of claim 22, wherein virtually no degradation in the quality of an original image occurs.

24. The method of claim 23, wherein the shape is generally hemispheric.

25. The method of claim 24, wherein the step of supplying the image related viewing position involves polling a head mounted display's position sensors.

26. The method of claim 25, wherein the position information includes roll, pitch and yaw data.

27. The method of claim 9, wherein the shape is generally spherical.

28. The method of claim 9, wherein the shape is generally toroidal shaped.

29. The method of claim 9, wherein the image is a bitmap from a broadcast cable image.

30. The method of claim 9, wherein the image is a bitmap from a DVD stored image.

31. The method of claim 9, wherein the image is a bitmap from live video.

32. The method of claim 9, wherein the image is a bitmap retrieved from memory.

33. The method of claim 9, wherein the image is a bitmap retrieved from a network based communication system.

34. The method of claim 9, wherein the image is a bitmap retrieved from satellite transmission.

35. The method of claim 9, wherein the image is a bitmap retrieved from the internet.

36. The method of claim 9, wherein the image is a bitmap retrieved through a cable system.

37. The method of claim 9, wherein the image is a bitmap retrieved from a video playback device.

38. A method for displaying a live video or still frame image, comprising the steps of:
   a) capturing an image;
   b) digitizing the captured image to form an image bitmap;
   c) inputting lens parameters for the lens used in capturing the image;
   d) calling up a lens matching shape through the input lens parameters;
   e) loading the lens matching shape;
   f) rendering the dithered image bitmap to the lens matching shape;
   g) updating viewing position information;
   h) updating zoom information;
   i) presenting a view corresponding to the zoom information and the viewing position information;
   j) checking for a termination command; and
   k) repeating steps f through j.

39. The method of claim 38, wherein the lens matching shape is created using graphics software.

40. The image display apparatus of claim 1, wherein the display comprises:
   (a) a steering mechanism; and
   (b) a viewing screen which shows a view of at least a portion of an image.

* * * * *